(12) United States Patent
Trapp et al.

(10) Patent No.: US 9,908,631 B2
(45) Date of Patent: Mar. 6, 2018

(54) OPTIMIZED AIRCRAFT PYLON FAIRING

(71) Applicant: Embraer S.A., São José dos Campos—SP (BR)

(72) Inventors: Luis Gustavo Trapp, São José dos Campos (BR); Israel Da Silva, São José dos Campos (BR); Murilo Mestriner, São Paulo (BR); Murilo Pinto Ribeiro, SJ Campos (BR)

(73) Assignee: EMBRAER S.A., São José dos Campos (BR)

( * ) Notice: Subject to any disclaimer, the term of this patent is extended or adjusted under 35 U.S.C. 154(b) by 248 days.

(21) Appl. No.: 14/953,817

(22) Filed: Nov. 30, 2015

(65) Prior Publication Data
US 2017/0152053 A1    Jun. 1, 2017

(51) Int. Cl.
*B64D 29/02* (2006.01)
*B64D 27/18* (2006.01)
*B64D 27/26* (2006.01)

(52) U.S. Cl.
CPC ............. *B64D 29/02* (2013.01); *B64D 27/18* (2013.01); *B64D 27/26* (2013.01)

(58) Field of Classification Search
CPC ........ B64D 29/02; B64D 27/06; B64D 27/12; B64D 27/18; B64C 7/02
See application file for complete search history.

(56) References Cited

U.S. PATENT DOCUMENTS

| | | | |
|---|---|---|---|
| 1,990,606 A * | 2/1935 | Junkers .................. | B64D 27/00 244/130 |
| 3,519,227 A * | 7/1970 | Brooks ..................... | B64C 7/02 244/55 |
| 5,102,069 A * | 4/1992 | Hackett .................. | B64D 29/02 244/130 |
| 5,443,230 A | 8/1995 | Lord et al. | |
| 7,798,875 B1 * | 9/2010 | Angel ...................... | B63H 5/16 440/82 |
| 8,336,813 B2 | 12/2012 | Bonnaud et al. | |

* cited by examiner

*Primary Examiner* — Richard R Green
(74) *Attorney, Agent, or Firm* — Nixon & Vanderhye P.C.

(57) ABSTRACT

Pylon fairings for an aircraft turbojet engine mounted below an aircraft wing are provided with inboard and outboard lateral faces which converge rearwardly to form a trailing edge of the pylon fairing and which are positioned so as to contact a portion of a cold flow exiting a fan duct of the turbojet engine, and a bottom face positioned above a hot exhaust flow exiting an exhaust nozzle of the turbojet engine. The trailing edge of the pylon fairing extends in an upward direction relative to an engine longitudinal axis of symmetry between a lower terminus at the bottom face and an upper terminus located at a lower surface of the aircraft wing. The lower terminus is coincident with a longitudinal midplane of the turbojet engine, and the upper terminus is offset in an inboard direction so that the trailing edge of the pylon fairing is cambered in the inboard direction between the lower terminus and the upper terminus.

11 Claims, 3 Drawing Sheets

OPTIMIZED AIRCRAFT PYLON FAIRING

FIELD

The embodiments disclosed herein relate generally to aircraft pylon fairings that provide optimized aerodynamics of pylon assemblies. The pylon fairings of the embodiments disclosed herein are especially useful for providing improved aerodynamics to engine mounting pylons employed to attach an aircraft turbofan engine to the underside of an aircraft wing.

BACKGROUND

Engine integration is one of the most difficult tasks in the aerodynamic design of an underwing podded engine aircraft. Specifically, it is a principal design goal for the pylon to minimize impacts to the aerodynamic flow around the wing, with minimal weight and complexity.

The channel space between the engine nacelle, pylon, wing and fuselage tends to accelerate the aerodynamic flow thereby producing different aerodynamic impacts. Among these problems are shock waves in the area between pylon, nacelle and wing lower surface, as well as airflow separation in the wing inboard lower surface.

Careful contouring of the pylon minimize the inboard acceleration thereby reducing the drag impact and minimizing the thrust loss. One of the techniques commonly used to improve the flow in this region is to increase the pylon length as much as possible, but an increase in the pylon length disadvantageously increases the pylon weight. Another technique includes providing a fairing in the upper part of the pylon and increase the length of only the pylon/wing fairing. In this regard, the fairing can sometimes be even longer than the wing thereby extending behind the trailing edge of the wing. Such partial pylon extension however still incurs a weight penalty even though to a lesser extent than the weight penalty associated with extending the entire pylon. Furthermore, a complicating factor with such a design alternative is that there may be high lift wing surfaces (e.g., flaps) in this region and therefore any protruding pylon section must also be able to move when the flaps are deployed, which in turn increases system complexity and weight, as well as cost.

One prior proposal for engine pylon fairings is U.S. Pat. No. 5,443,230 (the entire contents being expressly incorporated hereinto by reference) includes providing an airfoil which is curved away from the aircraft in an axial rearward direction and has a portion which is curved toward the aircraft in the vertical direction from the nacelle toward the wing. Another proposal is evident in U.S. Pat. No. 8,336,813 (the entire contents being expressly incorporated hereinto by reference) whereby the pylon is extended rearwardly and has a trailing edge which is shifted toward the root of the wing to which the pylon is mounted.

SUMMARY

The embodiments disclosed herein improve the aircraft aerodynamics by reducing the interference drag between the nacelle, pylon and wing through a transverse cambering of the pylon. Specifically, according to the embodiments disclosed herein, the pylon is transversely cambered inboard in the region where the pylon is in contact with the wing. According to the disclosed embodiments herein, the aerodynamic flow at the bottom of the pylon (pylon shelf) remains symmetric thereby minimizing impact to thrust, while in the upper region of the pylon the aerodynamic flow is adjusted to continuously change thereby minimizing thrust impact as well as reducing installation drag. The pylon length can be kept to a minimum thereby reducing pylon weight, part count, cost and wetted area.

According to certain embodiments, a pylon fairing for an aircraft turbojet engine mounted below an aircraft wing is provided, wherein the pylon fairing comprises inboard and outboard lateral faces which converge rearwardly to form a trailing edge of the pylon fairing and which are positioned so as to contact a portion of a cold flow exiting a fan duct of the turbojet engine, and a bottom face positioned above a hot exhaust flow exiting an exhaust nozzle of the turbojet engine. The trailing edge of the pylon fairing extends in direction relative to the engine longitudinal axis, between a lower terminus at the bottom face and an upper terminus located at a lower surface of the aircraft wing. The lower terminus is coincident with the vertical mid-plane passing through the longitudinal axis of the turbojet engine, and the upper terminus is offset in an inboard direction so that the trailing edge of the pylon fairing is cambered in the inboard direction between the lower terminus and the upper terminus.

Each of the inboard and outboard lateral faces may be convex, while the bottom face of the pylon fairing may be concave or planar. The trailing edge of the pylon fairing may be linear between the lower terminus and the upper terminus thereof or may be concavely cambered in an inboard direction.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

As used herein and in the accompanying claims, the terms "port" and "starboard" directionally relate to the aircraft's fuselage. In addition, the terms "inboard" and "outboard" directionally relate to the longitudinal centerline of the aircraft's fuselage, i.e., the term "inboard" is meant to refer to a direction toward the longitudinal centerline of the aircraft's fuselage while the term "outboard" is meant to refer to a direction away from the longitudinal centerline of the aircraft's fuselage.

Figure 1:
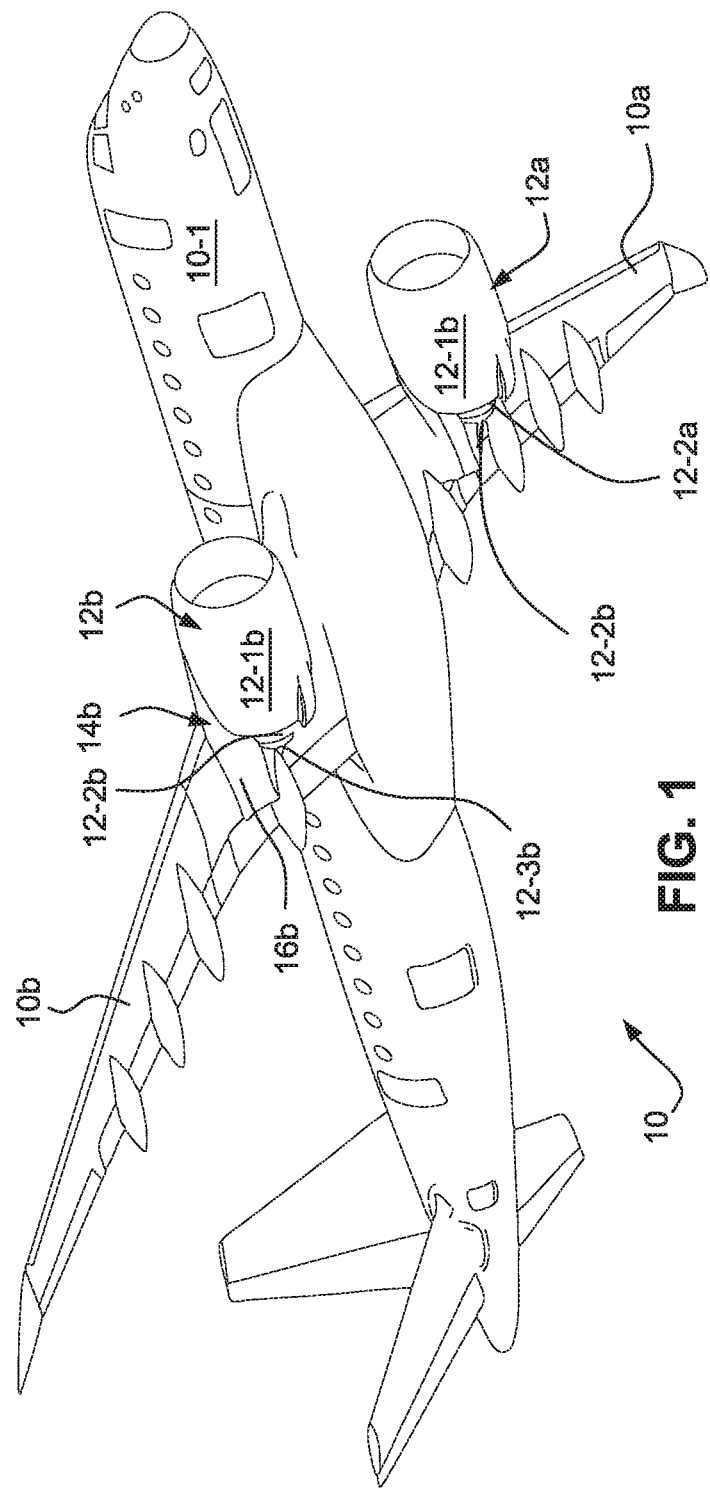
FIG. 1 is a front perspective view from below of the port side wing and associated aircraft engine mounted thereto by means of an engine mounting pylon having an optimized pylon fairing according to an embodiment of the invention.

Accompanying FIG. 1 depicts generally an aircraft 10 having a fuselage 10-1 and port and starboard wings 10a, 10b, respectively. Port and starboard turbojet engines 12a, 12b are shown attached to the underside of the wings 10a and 10b by way of a pylon mounting assemblies 14a, 14b (only pylon assembly 14b being visible in FIG. 1, but see FIGS. 2 and 3).

Figure 2:
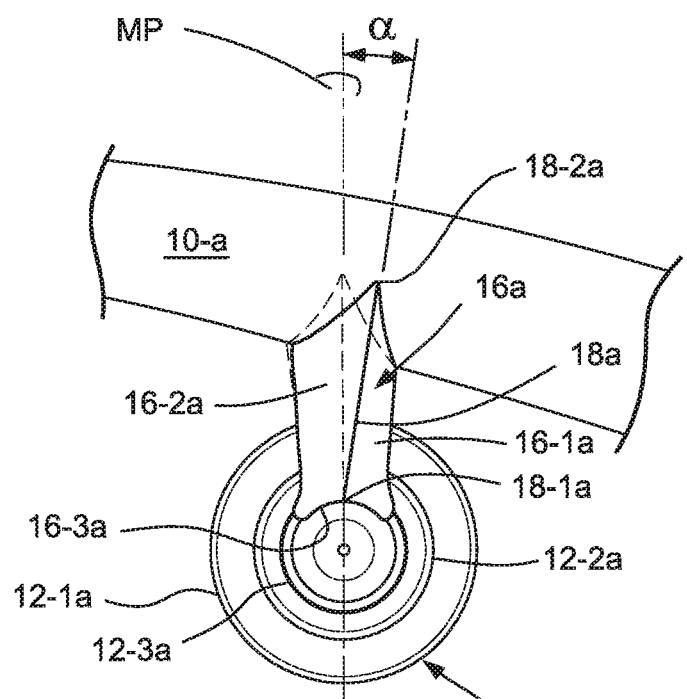
FIG. 2 is an enlarged aft elevational view of the engine mounting pylon and optimized pylon fairing as depicted in FIG. 1.
Figure 3:
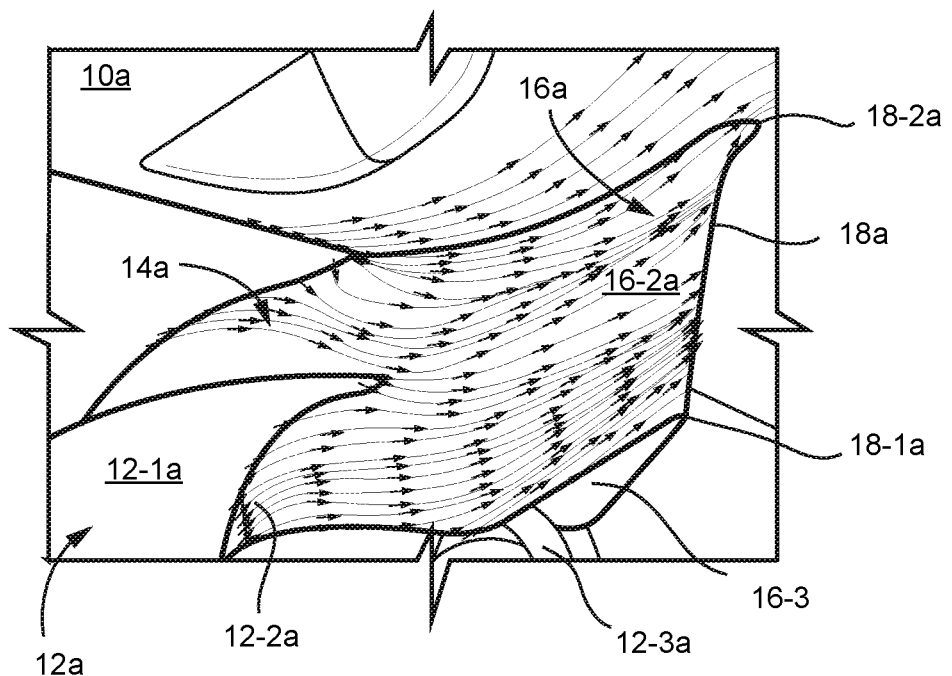
FIG. 3 is an enlarged aft perspective view from below of the engine mounting pylon and optimized pylon fairing as depicted in FIG. 2 showing aerodynamic flows.

The port engine 12a and its associated pylon mounting assembly 14a is shown in greater detail in accompanying FIGS. 2 and 3. It will of course be understood that the port and starboard engines 12a, 12b and their respective pylon mounting assemblies 14a, 14b are identical to but mirror images of one another. Thus, the description below in FIGS. 2 and 3 relative to the port engine 12a and its associated pylon mounting assembly 14a applies equally to both the starboard engine 12b and its associated pylon mounting assembly 14b. Identical structures associated with the port and starboard engines 12a, 12b and their associated pylon mounting assemblies 14a, 14b, will be shown in the drawings where visible by identical reference numerals with "a" and "b" suffixes.

As is conventional, the engine 12a has an engine nacelle 12-1a provided with a cold stream exiting the fan duct 12-2a and a hot exhaust stream exiting the exhaust nozzle 12-3a. The pylon mounting assembly 14 is connected to the top of the engine nacelle 12-1 and includes a pylon fairing 16a at a rear end thereof.

As is shown, the pylon fairing 16 extends rearwardly from the exhaust nozzle 12-3 of engine 12 and includes inboard and outboard lateral faces 16-1a, 16-2a and a bottom concave face 16-3a. In the depicted embodiment, the inboard and outboard lateral faces 16-1a, 16-2a are convex and converge rearwardly to form trailing edge 18a of the pylon fairing extending from a lower terminus 18-1a located at the bottom concave face 16-3a to an upper terminus 18-2a located at the lower surface of the port side wing 10a. In addition, the upper terminus 18-2a is cambered toward the inboard side of the engine 12a by an angle α relative to a midplane MP of the engine 12a. Angle α may range from about 0.5° to about 5°, typically about 2°.

The trailing edge 18 between the lower and upper terminus 18-1a, 18-2a, respectively, may be linear or concave in an inboard direction. Thus, as compared to a conventional pylon fairing shown by dashed lines in FIG. 2, although the lower terminus 18-1a will similarly be located at the midplane MP, the upper terminus 18-2a will be offset in an inboard direction.

The aerodynamic effects of the pylon fairing 16a is schematically depicted in FIG. 3, whereby the airstream flow at the pylon and wing surfaces is depicted by the lines with arrows. The aerodynamic flow at the bottom of the pylon 16-3 (pylon shelf) is not shown in FIG. 3 but remains symmetric thereby minimizing impact to thrust, while in the upper region of the pylon the aerodynamic flow is depicted in FIG. 3 as being smooth thereby minimizing thrust impact as well as reducing installation drag.

Various modifications within the skill of those in the art may be envisioned. For example, the bottom portion of the trailing edge of the pylon fairing according to the invention may be oriented substantially vertically, while an inboard cambering may be provided upwardly from such vertical bottom portion. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A pylon fairing for an aircraft turbojet engine mounted below an aircraft wing, wherein the pylon fairing comprises:
    inboard and outboard lateral faces which converge rearwardly to form a trailing edge of the pylon fairing and positioned so as to contact a portion of a cold flow exiting a fan duct of the turbojet engine, and a bottom face positioned above a hot exhaust flow exiting an exhaust nozzle of the turbojet engine, wherein
    the trailing edge of the pylon fairing extends in an upward direction relative to the engine longitudinal axis between a lower terminus at the bottom face and an upper terminus located at a lower surface of the aircraft wing, and wherein
    the lower terminus is coincident with the vertical midplane passing through the longitudinal axis of the turbojet engine, and the upper terminus is offset in an inboard direction so that the trailing edge of the pylon fairing is cambered in the inboard direction between the lower terminus and the upper terminus.

2. The pylon fairing as in claim 1, wherein each of the inboard and outboard lateral faces is convex.

3. The pylon fairing as in claim 1, wherein the bottom face is concave.

4. The pylon fairing as in claim 1, wherein the trailing edge of the pylon fairing is linear between the lower terminus and the upper terminus thereof.

5. The pylon fairing as in claim 1, wherein the trailing edge is concavely cambered in an inboard direction.

6. An aircraft comprising a fuselage, port and starboard wings extending laterally from the fuselage, and port and starboard turbojet engines mounted below the port and starboard wings, wherein each of the port and starboard turbojet engines comprises a pylon fairing as in claim 1.

7. A pylon mounting assembly for below wing mounting of a turbojet engine comprising:
    a mounting pylon for suspending the turbojet engine below the wing so that an intake of the turbojet engine is positioned forwardly of a leading edge of the wing; and
    a pylon fairing for the mounting pylon comprising inboard and outboard lateral faces which converge rearwardly to form a trailing edge of the pylon fairing and positioned so as to contact a portion of a cold flow exiting a fan duct of the turbojet engine, and a bottom face positioned above a hot exhaust flow exiting an exhaust nozzle of the turbojet engine, wherein
    the trailing edge of the pylon fairing extends in an upward direction relative to the engine longitudinal axis between a lower terminus at the bottom face and an upper terminus located at a lower surface of the aircraft wing, and wherein
    the lower terminus is coincident with the vertical midplane passing through the longitudinal axis of the turbojet engine, and the upper terminus is offset in an inboard direction so that the trailing edge of the pylon fairing is cambered in the inboard direction between the lower terminus and the upper terminus.

8. The pylon mounting assembly as in claim 7, wherein each of the inboard and outboard lateral faces is convex.

9. The pylon mounting assembly as in claim 7, wherein the bottom face is concave.

10. The pylon mounting assembly as in claim 7, wherein the trailing edge of the pylon fairing is linear between the lower terminus and the upper terminus thereof.

11. The pylon mounting assembly as in claim 7, wherein the trailing edge is concavely cambered in an inboard direction.

\* \* \* \* \*